United States Patent [19]

Hsieh

[11] Patent Number: 4,816,432

[45] Date of Patent: Mar. 28, 1989

[54] CATALYST COMPOSITION FOR POLYMERIZING ALPHA OLEFINS

[75] Inventor: J. T. T. Hsieh, Warren, N.J.

[73] Assignee: Mobil Oil Corporation, New York, N.Y.

[21] Appl. No.: 56,178

[22] Filed: May 28, 1987

[51] Int. Cl.$^4$ ................................................ C08F 4/62
[52] U.S. Cl. .................................... 502/107; 502/104; 502/113; 502/117; 502/171; 526/114; 526/129; 526/169
[58] Field of Search ............... 502/104, 113, 117, 171, 502/107

[56] References Cited

U.S. PATENT DOCUMENTS

| | | | |
|---|---|---|---|
| 3,351,623 | 11/1967 | Walker et al. | 260/94.9 |
| 4,146,695 | 3/1979 | de Leemput | 502/117 X |
| 4,368,302 | 1/1983 | Downs | 502/113 X |
| 4,374,234 | 2/1983 | Stricklen et al. | 526/105 |
| 4,670,413 | 6/1987 | Furtek | 502/117 X |

FOREIGN PATENT DOCUMENTS 2023153 5/1969 United Kingdom .

*Primary Examiner*—Patrick P. Garvin
*Attorney, Agent, or Firm*—Alexander J. McKillop; Charles J. Speciale; Stanislaus Aksman

[57] ABSTRACT

A modified catalyst for polymerizing alpha-olefins, for example, ethylene, is prepared by combining a chromium-compound-comprising catalyst, supported on a refractory oxide support with at least one catalyst modifier of the formula R Mg R' where R and R' are the same or different $C_1$-$C_{12}$ hydrocarbyl, alkoxy, alkenoxy or aryloxy groups. The amount of the modifier is such that the modified catalyst composition has the molar ratio of magnesium to chromium of about 0.2 to about 1.25. The modified catalyst composition produces resins of relatively high HLMI at relatively low temperatures.

There is also disclosed a process for polymerizing alpha-olefins, at relatively lower temperatures than was heretofore possible, to obtain resins of relatively high HLMI, using the modified catalyst composition. The resulting polymers can be used for the fabrication of blow-molded products, e.g., household and industrial containers.

79 Claims, No Drawings

CATALYST COMPOSITION FOR POLYMERIZING ALPHA OLEFINS

BACKGROUND OF THE INVENTION

1. Field of the Invention

The present invention is directed to a chromium compound-containing catalyst for polymerizing alpha-olefins, also known as 1-olefins, and to a method of polymerizing such olefins. More particularly, the invention is directed to a method of producing polymers of ethylene or copolymers of ethylene and at least one $C_3$–$C_{10}$ alpha-olefin, which are useful in the fabrication of products for blow molding applications, especially for the household and industrial containers (HIC) market, at lower temperatures than was heretofore possible.

2. Description of the Prior Art

Chromium compound-containing alpha-olefin polymerization catalysts, also known as Phillips catalysts, have been extensively described in the literature. They are formed by supporting chromium trioxide, or a compound calcinable thereto, on a refractory oxide support material, for example, silica, alumina, zirconia, thoria or silica-alumina, and heating the oxide support material in a non-reducing atmosphere, preferably an oxidizing atmosphere, to produce an active polymerization catalyst. The produced catalyst is used to polymerize 1-olefins in a suitable process, such as the so-called "solution form" or "particle form" process. In the "solution form" process, the monomeric 1-olefin, which is normally ethylene or a mixture of ethylene with up to about 40 wt. % of other 1-olefins, is contacted with a suspension of the catalyst in a liquid hydrocarbon which is a solvent for the polymer at the polymerization temperature employed. In the "particle form" process, the monomer 1-olefin is contacted with a suspension or a fluidized bed of the catalyst particles in a fluid medium under conditions such that the polymeric 1-olefin forms as solid particles suspended in or fluidized in the fluid medium. The fluid medium can be, for example, a liquid hydrocarbon or a gas. Examples of suitable liquid hydrocarbons are isobutane and n-pentane. Examples of suitable gases are nitrogen or argon mixed with the gaseous monomer, or the undiluted gaseous monomer. Processes of this type are described in, for example, U.K. published patent specification Nos. 790,195; 704,641; 853,414; 886,784 and 899,156. It is also known to modify such catalysts with a titanium compound, for example, to render the catalyst capable of producing polyolefins having increased melt index (i.e., lower average molecular weight) or to increase the stress crack resistance of the produced polyolefin. Catalysts of this type are described in, for example, U.S. Pat. No. 3,622,521 to Hogan et al and U.K. published patent specification Nos. 1,334,662 and 1,326,167.

U.S. Pat. No. 3,351,623 to Walker et al discloses a catalyst for polymerizing ethylene at a temperature in the range of 275° to 335° F., i.e., under solution form process conditions, the catalyst being one which forms on mixing (1) an oxide component selected from the group consisting of silica; mixtures of silica and alumina containing up to 25 wt. % alumina; and mixtures of chromium oxide and at least one material selected from the group consisting of silica, alumina, zirconia and thoria, at least part of the chromium oxide being in the hexavalent state at the initial contacting of the monomer therewith, (2) an organo metallic component of formula $R_xM$ where R is selected from the group consisting of hydrogen and alkyl, aryl, cycloalkyl, alkoxy radicals and combinations of these radicals containing up to 12 carbon atoms, at least one R group being a hydrocarbon radical; M is selected from the group consisting of aluminum, gallium, indium, thallium, zinc, boron, lead, lithium, zirconia, cobalt, magnesium and tin; and x is an integer equal to the valence of M, and (3) a vanadium component selected from the group consisting of vanadium chelates and vanadyl chelates. Walker et al seek to produce a catalyst that permits the use of high polymerization temperatures to obtain relatively low melt index polymers.

Downs, U.S. Pat. No. 4,368,302, discloses a modified alpha-olefin catalyst composition used in preparing polymers of ethylene or copolymers of ethylene and higher alpha-olefins, having high average molecular weight and a relatively broad molecular weight distribution, as evidenced by relatively high values of melt flow ratio (MFR), referred to by Downs as melt index ratio (MIR). The catalyst composition of Downs is prepared by supporting chromium oxide on a refractory oxide support material, adding at least one tetravalent titanium compound and heating to activate the product. The monomer is contacted with the active polymerization catalyst in the presence of one or more organometallic compounds, e.g., dibutylmagnesium or triethylaluminum. The amount of the organometallic compounds is 0.1–100% by weight (wt%), preferably 1 to 10 wt %. The refractory oxide support has a mean particle diameter of about 20–150 microns ($\mu$).

U.K. patent application No. 2,023,153 to Eve discloses an ethylene polymerization catalyst comprising: (A) a heat activated supported chromium oxide catalyst, and (B) a catalyst modifier comprising a magnesium compound, such as a dialkyl magnesium, preferably dibutyl magnesium, and a commercially available product believed to comprise a mixture of dibutyl magnesium, dialkyl magnesium and butyl-alkyl magnesium. The polymerization process, conducted in the presence of this catalyst, produces polyethylene or ethylene copolymers having broad molecular weight distribution and low melt index. The quantity of the catalyst modifier is such that the atomic ratio of magnesium to chromium in the modified catalyst system is 0.01:1 to 100:1, preferably, 0.01:1 to 10:1.

Stricklen et al., U.S. Pat. No. 4,374,234, discloses a silica-supported chromium catalyst to which is added up to 5 ppm of an aluminumalkyl or dihydrocarbomagnesium compound, e.g., dibutylmagnesium, in order to reduce the induction period and increase catalyst activity. The addition of the aluminum or the magnesium compounds has only a modest effect on polymer properties.

When polymers of ethylene or copolymers of ethylene and of one or more $C_3$–$C_{10}$ alpha-olefin useful for the blow-molding applications, e.g., for the HIC market, are produced using the above-identified prior art catalysts, e.g., in a slurry reactor, the reaction must either be conducted at relatively high temperatures of about 108°–110° C., approaching melting or sintering temperatures of the product resin, or with a relatively high level of oxygen intentionally added to the reactor (oxygen add-back) to produce a resin having the desired high load melt index (HLMI).

The operation of some reactors, such as slurry reactors, at the high temperature requires very elaborate control apparatus to prevent fusion and agglomeration of the resin particles, particularly the small size resin particles (fines), e.g., particles of the size less than 74 microns ($\mu$) in the reactor, e.g., on the reactor walls, and in the filter separating solid particles from the solvent. Since a typical resin produced with such a catalyst begins to melt and agglomerate at about 115° C., even minute temperature excursions above the reactor operating temperature can cause severe fines agglomeration, referred to in the art as fouling, in the reactor and auxiliary process equipment.

Additionally, as is known to those skilled in the art, when fluid bed alpha-olefin polymerization reactor systems are utilized, a recirculation compressor is used to recycle the fluidizing gas and unreacted monomers, if any, to the fluid bed reactor. The recycled fluidizing gas also contains at least some entrained polymer particles. The system also utilizes heat exchangers, usually located downstream of the compressor, to remove substantial amounts of exothermic heat generated during the reaction (e.g., See Goeke et al, U.S. Pat. No. 4,302,565). The compressor inherently increases the temperature of the gas stream compressed therein. Since the temperature gradient between the fluid bed reactor operating temperature and the melting temperature of the resin is very small (e.g., about 7°–9° C.), even a small elevation of the temperature of the fluidizing gas may cause fusion and agglomeration of the polymer particles in the compressor. If the temperature of the recycle gas is increased to the level wherein the fusion of the polymer particles takes place, the polymer particles will also tend to fuse and agglomerate in the heat exchangers and on the distribution plate of the reactor utilized to provide a uniform fluidized bed of particles therein.

In such fluid bed polymerization systems, the danger of polymer particles' fusion is exacerbated by the presence of catalyst particles in the polymer particles. As is known to those skilled in the art, the product polymer particles, also referred to herein as resin particles, produced in the polymerization reactor system, contain minute amounts of the catalyst particles which are not removed therefrom because the content thereof in the resin is so small as to render the removal of the catalyst particles unnecessary. The catalyst is inactivated when the resin is removed from the reactor. However, the resin in the reactor system contains catalytically-active catalyst particles. These catalytically-active catalyst particles continue to promote the alpha-olefin polymerization reaction which is exothermic in nature, thereby producing an additional amount of heat. This heat, together with the inherent increase of the recycle gas temperature in the recycle compressor, combines to dangerously decrease the safety temperature margin between the reactor operating temperature and the resin fusion temperature. The polymer particles most susceptible to fusion are polymer fines. If fusion and agglomeration of polymer particles takes place in the recycle compressor, heat exchangers, distribution plate and/or any other parts of the polymerization system, the process efficiency is substantially decreased, and, ultimately, the fluidized bed system may have to be shut down to remove the fused polymer particles.

As mentioned above, the HLMI of the resin may also be increased by increasing the amount of oxygen added to the reactor, such as a slurry reactor, e.g., see Dalig et al. *KHIMIYA I TEKNOLOGIYA POLYMEROV*, Vol. 23, No. 4 (1961), Ermakov et al, "Transfer Processes During Polymerization of Ethylene on a Chromium Oxide Catalyst. II. The Role of Impurities In Transfer Reactions", *KINETICS AND CATALYSIS (USSR)*, Vol 10, No. 333 (1969). However, the increased oxygen content in the reactor may promote the formation of polymer fines, especially in a fluid bed reactor, which are most likely to fuse in such a reactor system. The alpha-olefin fluidized bed reactors, unlike fluidized bed reactors used in different chemical processes, e.g., fluid catalytic cracking, do not usually utilizes fines removing equipment, such as cyclones or filters, because it is feared that such equipment may provide additional sites for fines to fuse and agglomerate. Thus, any polymer fines produced in the polymerization system tend to remain in the reactor loop. Accordingly, the use of relatively high amounts of oxygen to obtain resins of a desired HLMI may also lead to the fouling of the process equipment, such as compressor and heat exchangers, and, ultimately, to the shut-down of the reactor system.

Accordingly, it is a primary object of this invention to provide an improved polymerization catalyst which produces polymers of HLMI suitable for the blow molding applications at substantially lower operating temperatures than was heretofore possible with other catalysts utilized in polymerization reactions at comparable conditions.

It is an additional object of the present invention to provide an alpha-olefin polymerization process which produces polymers of ethylene and/or $C_3$–$C_{10}$ alpha-olefins, having such an HLMI that renders them suitable for the blow molding applications at lower temperatures than was heretofore thought possible, and with reduced polymer fines formation.

Additional objects of the invention will become apparent to those skilled in the art from the following specification and the attached claims.

SUMMARY OF THE INVENTION

Polymers suitable for the blow molding applications, such as for the HIC market, are prepared at relatively low polymerization temperature, substantially below the polymer resin sintering temperature, in the presence of a modified, supported chromium compound-containing alpha-olefin polymerization catalyst. The catalyst is modified by combining it with at least one catalyst modifier of the formula:

where R and R' are the same or different $C_1$–$C_{12}$ hydrocarbyl, alkoxy, alkenoxy or aryloxy groups. The amount of the modifier is such that the modified catalyst composition has the molar ratio of magnesium (Mg) to chromium (Cr) of about 0.2 to about 1.25.

A polymerization process for polymerizing alpha-olefins in the presence of the modified catalyst composition produces polymer resins, at relatively low temperatures, having relatively high values of HLMI.

DETAILED DESCRIPTION OF THE INVENTION

In the modifier of the invention, R and R' are preferably $C_1$ to $C_8$, and more preferably $C_1$ to $C_6$ hydrocarbyl, alkoxy, alkenoxy or aryloxy groups. Suitable hydrocarbyl groups are alkyl, alkenyl and aromatic groups, such as methyl, ethyl, propyl, n-butyl, iso-butyl, cyclobutyl, n-pentyl, iso-pentyl, cyclo-pentyl, hexyl, ethenyl, propenyl, 1-butenyl, 2-butenyl, benzyl, toluyl and ortho-, meta- and para-xylyl.

Alkoxy groups could be unsubstituted or substituted by alkyl, alkenyl, alkoxy or alkenoxy groups. Suitable unsubstituted alkoxy groups are methoxy, ethoxy, propoxy, n-butoxy, iso-butoxy, cyclobutoxy, n-pentoxy, iso-pentoxy, cyclo-pentoxy and hexoxy. Examples of suitable substituted alkoxy groups are methylmethoxide, methylethoxide, ethylethoxide, methoxymethoxide, methoxyethoxide, ethoxymethoxide, ethoxyethoxide, ethoxypropoxide, propoxyethoxide, and butoxybutoxide. Examples of suitable alkenoxy groups are ethenoxy, propenoxy, 1-butenoxy and 2-butenoxy. Examples of suitable aryloxy groups are phenoxy, and substituted benzenes, such as alkyl- and alkenyl-benzenes, wherein the substituent is oxygenated, so that such substituted benzenes are linked to the magnesium (Mg) of the catalyst modifier through an oxygen atom. Suitable substituted benzenes are toluene, ortho-, meta- and para-xylenes, and vinyl benzenes, wherein the alkyl and/or alkenyl substituents are oxygenated as set forth above.

In particularly preferred embodiments, R and R' are $C_2$ to $C_4$ normal alkyl or alkoxyalkoxide groups, and most preferably both R and R' are normal-butyl (n-butyl) or ethoxyethoxide. An example of a commercially available, most preferred catalyst modifier used in this invention is a product of the empirical formula (n-butyl)$_{0.9}$ (n-octyl)$_{0.1}$ Mg (sec-butyl), having the average formula weight of 145. The amount of the modifier used is such that the molar ratio of magnesium (calculated as elemental magnesium) to chromium (calculated as elemental chromium) in the final catalyst composition is about 0.2:1 to about 1.25:1, preferably it is about 0.4:1 to about 1.1:1, and most preferably about 0.5:1 to about 1:1. It was found that the combination of the catalyst modifier with the catalyst composition produces resins having a relatively high HLMI, and that such resins can be produced at relatively low polymerization temperatures.

Although the magnesium modifier can be combined with the activated catalyst either outside of the polymerization reaction vessel, before the catalyst is introduced thereinto, or simultaneously with the introduction of the catalyst into the polymerization reaction vessel, it is preferred to combine it with the catalyst outside of the polymerization reaction vessel to facilitate the control of the magnesium modifier concentration. If the magnesium modifier is introduced into the polymerization reactor separately from the activated catalyst composition, the rate of feed of the magnesium modifier into the polymerization reactor must be such that the aforementioned molar ratios of magnesium to chromium on the catalyst are maintained.

The catalyst composition used herein is any supported alpha-olefin chromium compound-containing catalyst composition. The support used for the catalyst is any refractory oxide support material known in the art, such as silica, silica-alumina, alumina, zirconia or thoria.

The chromium compound is $CrO_3$ or any compound of chromium which is calcinable thereto under the catalyst activation conditions. At least a portion of the chromium in the supported, activated catalyst must be in the hexavalent state. Chromium compounds, other than $CrO_3$, which may be used as disclosed in U.S. Pat. Nos. to Hogan et al, 2,825,721 and 3,622,521, the disclosures of which are incorporated herein by reference, and include chromium nitrate, chromium carbonate, chromium acetate, ammonium chromate, chromium chloride, tertiary butyl chromate, chromium acetylacetonate, and chromium sulphate.

Water soluble compounds of chromium, such as $CrO_3$, are the preferred compounds used to deposit the chromium compound on the refractory oxide support from a solution of the compound. However, organic solvents-soluble chromium compounds may also be used.

The catalyst composition also preferably contains a titanium compound or compounds.

Suitable titanium compounds which may be used include all titanium compounds which are oxidizable to $TiO_2$ under the activation conditions employed, and include those disclosed in U.S. Pat. No. 3,622,521 and Netherlands patent application No. 72-10881 (the disclosures of both of which are incorporated herein by reference). These compounds include those having the structures

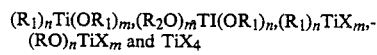

where m is 1, 2, 3 or 4, n is 0, 1, 2 or 3 and m+n=4;

$R_1$ is a $C_1$ to $C_{12}$ alkyl, aryl or cycloalkyl group, and combinations thereof, such as aralkyl and alkaryl groups;

$R_2$ is $R_1$, a cyclopentadienyl group, $C_2$ to $C_{12}$ alkenyl groups, such as ethenyl, propenyl, isopropenyl or butenyl; and, X is chlorine, bromine, fluorine or iodine.

The titanium compounds thus include titanium tetrachloride, titanium tetraisopropoxide and titanium tetrabutoxide. The most preferred titanium compound is tetraisopropyltitanate. The titanium compounds are conveniently deposited on the support from a hydrocarbon solvent solution thereof. The amount of the titanium compound used is such that there is an excess of the moles of titanium (calculated as elemental titanium) with respect to the moles of chromium (calculated as elemental chromium) in the catalyst composition. Thus, the titanium (calculated as elemental titanium) is present in the final catalyst product, with respect to the chromium (calculated as elemental chromium), in a molar ratio of about 0.5 to about 180, and preferably about 4 to about 35.

After the titanium compound is deposited on the catalyst, the resulting solid material is activated at an elevated temperature in a conventional manner.

The supported catalyst composition contains, based on the combined weight of the support and the chromium and titanium therein, about 0.05 to about 3.0, preferably about 0.10 to about 0.25, more preferably about 0.13 to about 0.18 and most preferably about 0.15 to about 0.18 weight percent of chromium (calculated as elemental chromium), and about 1.5 to about 9.0, preferably about 3.0 to about 7.0 and most preferably about 3.7 to about 6.0 weight percent of titanium (calculated as elemental titanium).

In the most preferred embodiment of the invention, the catalyst composition is that disclosed by Hsieh et al, U.S. patent application, Ser. No. 939,323, filed on Dec. 8, 1986, the entire contents of which are incorporated herein by reference. Accordingly, for the purpose of simplification and exemplification, the invention will now be described in conjunction with that preferred embodiment. However, it will be understood by those skilled in the art that the invention is not limited to that particular preferred embodiment.

The catalyst of Hsieh et al is synthesized with a refractory oxide support which is substantially non-spherical and irregular in shape and which has a relatively broad particle size distribution range. The support has at least 75% of its pore volume in pores of about 200 to about 500 angstrom diameter. The catalyst is also synthesized with at least one tetravalent titanium compound; with $CrO_3$ or any compound of chromium calcinable thereto; and it is activated by heating the catalyst for at least about 10 hours at a temperature of at least about 800° C.

More particularly, the catalyst of Hsieh et al is prepared in a process comprising the steps of:
1. drying or dehydrating a refractory oxide support material at a temperature of about 100° to about 500° C., preferably about 150° to about 300° C. and most preferably at about 200° C. for at least about 14 hours (hrs), preferably at least about 16 hours, and most preferbly for about 16 hrs in a nitrogen atmosphere;
2. depositing a chromium compound onto the dried support;
3. contacting the thus-obtained catalyst intermediate with at least one tetravalent titanium compound; and
4. purging the flammable components with nitrogen, preferably at about 325° C., and subsequently thermally activating the resulting solid, in an air atmosphere, at a temperature of at least about 800° C., preferably at least about 820° C., more preferably at about 820° to about 870° C., and most preferably at about 825° C. for at least about 10 hrs; preferably at least about 14 hrs, more preferably for at least about 16 hrs, and most preferably for about 16 hrs, to obtain an active catalyst composition.

In a preferred embodiment of the Hsieh et al catalyst synthesis, the refractory oxide support has a chromium compound deposited thereon prior to the drying or dehydration thereof in step 1.

The refractory oxide support material used for the Hsieh et al catalyst can be any support known in the art, such as silica, silica-alumina, silica-titania, alumina, zirconia or thoria, so long as it produces catalyst particles which are non-spherical and irregular in shape and of such size that the diameter of the catalyst particles is about 5 to about 250 microns ($\mu$), preferably about 10 to about 200$\mu$, as determined by Scanning Electron Microscopy (SEM). The majority of the particles of the Hsieh et al catalyst must have relatively large particle diameters. Thus, the catalyst has a median particle diameter of about 50 to about 100, preferably about 60 to about 80 and most preferably about 75$\mu$, as determined by volume distribution using a HIAC-ROYCO PA-720 particle size analyzer, and it has the following particle size distribution:cumulative volume distribution—10 to 90% of the particles have diameters of about 28 to about 150, preferably about 30 to about 125 and most preferably about 37 to about 117$\mu$, also as determined in a HIAC-ROYCO particle size analyzer. Additionally, at least 75% of the pore volume of the refractory oxide support is in the pores of about 200 to about 500 Angstrom diameter, preferably at least 80% of its pore volume is in the pores of about 250 to about 450 Angstrom diameter, and most preferably at least 85% of its pore volume is in the pores of about 250 to about 450 Angstrom diameter. The most preferred refractory oxide support material is silica containing about 0.18% by weight of chromium trioxide ($CrO_3$) and having about 88% of its pore volume in the pores of about 250 to about 450 Angstrom diameter, particle diameter of about 10 to about 200 microns, available commercially from Joseph Crosfield & Sons Ltd., Applied Silicas Division, Warrington, England, under the tradename of SD-186.

The chromium compound and the tetravalent titanium compound are usually deposited on the support from the solutions thereof and in such quantities as to provide, after the activation step, the desired levels of chromium (Cr) and titanium (Ti) in the catalyst. The order of addition of the chromium and the titanium compounds to the support is not critical, provided that such compounds are added before the activation of the catalyst and the support is dried before the titanium compound is added thereto. However, it is preferred to deposit the chromium compound onto the support before the titanium compound.

The modified catalyst composition of this invention is used to polymerize either ethylene alone or ethylene in conjunction with higher monomers, such as any one of $C_3$–$C_{10}$ alpha-olefins, e.g., 1-butene, 1-pentene, 1-hexene, 4-methyl-1-pentene, 1-heptene or 1-octene, preferably 1-butene, 1-pentene, 1-hexene or 4-methyl-1-pentene and most preferably 1-hexene. The polymerization reaction may be carried out using any suitable, conventional olefin polymerization process, such as a slurry, particle form or vapor phase, e.g., fluid bed reactor, but preferably it is carried out in a slurry or particle form process. The reaction is conducted substantially in the absence of catalyst poisons, such as moisture, carbon monoxide and acetylene, with a catalytically effective amount of the catalyst at a temperature and pressure conditions sufficient to initiate the polymerization reaction.

In order to achieve density ranges of about 0.915 to about 0.965 g/cc in the copolymers, which includes the range of about 0.947 to about 0.959 g/cc required for HIC applications, it is necessary to copolymerize enough of the $C_3$ or higher comonomers with ethylene to achieve a level of about 0.1 to about 25 mole percent of the $C_3$ to $C_{10}$ comonomer in the copolymer. The amount of comonomer needed to achieve this result will depend on the particular comonomer(s) being employed. Further, the various intended comonomers have different reactivity rates, relative to the reactivity rate of ethylene, with respect to the copolymerization thereof with the catalysts of the present invention. Therefore, the amount of comonomer used in the stream of monomers fed to the reactor will also vary depending on the reactivity of the comonomer.

In the most preferred embodiment, the catalyst of the present invention is used to polymerize 1-hexene and ethylene in a slurry process to obtain polymers having the density of about 0.947 to about 0.959 g/cc, which are especially suitable for HIC applications.

The catalyst of the invention may be used to polymerize $C_2$–$C_{10}$ alpha-olefins in any suitable, known polymerization process, such as in a slurry reactor, in a solution form process, in a particle form process, or in a fluid bed reactor. The modified catalyst composition of this invention is especially suitable for producing polymers of $C_2$–$C_{10}$ alpha-olefins in a slurry reactor in the presence of about 0 to about 0.35 ppmw of oxygen, calculated on the basis of ethylene feed, because it makes possible the operation of the reactor at lower temperature than without oxygen to produce polymer resins having very high HLMI values of about 0.1 to about 200, preferably about 1 to about 100. It was found that the use of the catalyst modifier in the relatively low proportions specified herein produces a modified catalyst composition capable of producing resins having HLMI values of over 100, while comparable catalyst compositions without the modifier of this invention produce resins having HLMI values an order of magnitude lower. This is especially surprising since catalyst compositions containing higher or lower amounts of the modifier than those specified herein produce resins of substantially lower HLMI values. As is known to those skilled in the art, heretofore-used Phillips catalysts required slurry reactor temperatures of about 108° C.-110° C. to produce polymer resins having HLMI values suitable for processing in blow-molding machines to produce products for the HIC market, such as bottles having high environmental stress crack resistance. Since the resins begin to fuse and agglomerate at about 115° C., the reactor operation at about 108°-110° C. may, and occasionally does, cause agglomeration of fine particles on reactor walls and at least partial fusion of fine resin particles in the reactor and in the filter separating solid particles from the diluent. In prior art, the HLMI of the resin was also increased by increasing the amount of oxygen or oxygen-containing gas (oxygen add-back), such as air, added to the reactor. While the reactor operation with the higher oxygen add-back increased the HLMI to the desired level, it also created additional quantities of resin fines which increased the risk of fouling of the process equipment, such as the reactor and the filter.

The catalyst composition of this invention substantially decreases, if not completely eliminates, the danger of process equipment fouling because, at a given level of oxygen introduced into the reactor, it enables the operation of the polymerization reaction at a substantially lower temperature than was heretofore thought possible to produce polymer resins having the desired HLMI values. Thus, the safety margin between the reactor operating temperature and the resin agglomeration and fusion temperature is increased, thereby reducing, if not substantially eliminating, the danger of equipment fouling by the fused (melted) and agglomerated resin particles.

The operation of the reactor with the modified catalyst of the invention also produces substantially reduced amounts of polymer fines, as compared to the operation of the reactor at comparable conditions with the previously-available Phillips catalyst compositions. Since the polymer fines are most likely to fuse when the temperature safety margin is decreased, e.g., due to unanticipated temperature surges, the low level of fines provides additional protection against polymer fusion and agglomeration in the polymerization system.

Hydrogen may be used in the polymerization reaction of the present invention in such amounts that the ratio of hydrogen to ethylene is between about 0 to about 2.0 moles of hydrogen per mole of the ethylene monomer in the gas stream. Any gas inert to the catalyst and reactants may also be present in the feed stream. The modifier is combined with the activated catalyst either prior to or simultaneously with the introduction thereof into the reactor system.

It is essential to operate the reactor at a temperature below the sintering temperature of the polymer particles. To insure that sintering will not occur, operating temperatures below the sintering temperature are desired. For the production of ethylene copolymers in the process of the present invention, an operating temperature of about 30° to 105° C. is preferred, and a temperature of about 75° to 103° C. is most preferred. Temperatures of about 75° to 90° C. are used to prepare polymer products having a density of about 0.90 to 0.92 gms/cc, temperatures of about 80° to 100° C. are used to prepare products having a density of about 0.92 to 0.94 gms/cc, and temperatures of about 90° to 105° C. are used to prepare products having a density of about 0.94 to 0.96 gms/cc.

The use of the catalyst of the present invention in any suitable olefin polymerization process, e.g., slurry process, produces polymers in which the net bottle weight and melt flow ratio characteristics can be simultaneously controlled without adversely affecting other properties of the polymers, such as strength thereof. The catalyst of the invention can be used to produce both linear low density polyethylene (LLDPE) and high density polyethylene (HDPE).

The following Examples further illustrate the essential features of the invention. However, it will be apparent to those skilled in the art that the specific reactants and reaction conditions used in the Examples do not limit the scope of the invention.

The properties of the polymers produced in the Examples were determined by the following test methods:

| | |
|---|---|
| Density | ASTM D-1505 - A plaque is made and conditioned for one hour at 100° C. to approach equilibrium crystallinity. Measurement for density is then made in a density gradient column; reported as gms/cc. |
| Melt Index (MI), $I_2$ | ASTM D-1238 - Condition E - Measured at 190° C. - reported as grams per 10 minutes. |
| High Load Melt Index (HLMI), $I_{21}$ | ASTM D-1238 - Condition F - Measured at 10 times the weight used in the melt index test above, reported as grams per 10 minutes. |
| Melt Flow Ratio (MFR) = | $\dfrac{I_{21}}{I_2}$ |
| Annular Die Swell (gr) | Measured by weighing 252 centimeters (cm) of a tube extruded at shear rate of 2000 1/sec through an annular die having a tapered entrance angle of 24.4°; die lend length of 3.05 mm; die gap of 0.505 mm and average die diameter of 5.16 mm. |

EXAMPLE 1

(Catalyst Synthesis)

A catalyst composition of Hsieh et al was prepared in the following multi-step procedure.

Step 1 (Drying)—A chromium oxide coated silica (0.18% wt. Cr, calculated as chromium trioxide) having about 88% of its pore volume in the pore sizes of between 250 and 450 Angstroms (Crosfield's SD-186) was introduced into a fluid-bed drying vessel maintained under nitrogen ($N_2$) at an ambient temperature and pressure. The temperature of the vessel was increased at the rate of 25° C./hour until it reached about 200°-210° C. The silica was dried in nitrogen atmosphere at about 200°–210° C. for 16 hrs. It was then cooled to below 100° C. in 2–4 hrs.

Step 2 (Titanation)—21 grams (gm) of the product of Step 1 was slurried in 100 ml of hexane and 7.5 ml of tetraisopropyltitanate was added at room temperature and the resulting brown slurry heated to 60°–80° C. under a vigorous nitrogen purge until the solid was dry (about 16–24 hrs). The hexane was removed in an oil bath with the temperature set at 70° C. over the period of 16–24 hrs.

Step 3 (Activation)—Under good fluidization, the product of Step 2 was heated at 25° C./hr until it reached the temperature of 300° C. It was then heated at 300° C. for 2 hours in nitrogen; the nitrogen atmosphere was changed to air; the temperature was increased from 325° C. to 825° C. at 100° C./hr; and, it was heated for 16 hrs at 825° C. in dry air. The temperature was then decreased to 150° C. in air atmosphere as fast as possible and then to ambient temperature in nitrogen atmosphere. The nitrogen purge was maintained for 1 hour at ambient temperature. The product was a yellow-orange catalyst which analyzed as follows:

Cr=0.18%wt.
Ti=4.0%wt.

EXAMPLE 2

(Catalyst Preparation With Di-Butyl Magnesium Incorporated Into The Catalyst Outside of the Reactor)

The first three synthesis steps of the catalyst composition of this example were identical to those of the Example 1 catalyst composition synthesis. The product of Step 3 was then treated in accordance with the procedure of Step 4, set forth below, to produce a catalyst composition of this invention.

Step 4 (Modifier Treatment)—Under a nitrogen atmosphere, 7.7 grams of the Step 3 product was slurried in 70 ml of hexane. 0.21 ml of di-butyl magnesium (0.71 molar solution of dibutyl magnesium in hexane, available from the Lithium Corporation of America, Gastonia, N.C.) was added and the slurry was stirred for 30 minutes. The hexane was driven off under a nitrogen purge at 65° C. to form a free flowing solid. Elemental analysis of this solid gave a Mg to Cr molar ratio of 0.5 and a Ti to Cr molar ratio of 25.

EXAMPLE 3

(Catalyst Preparation With Di-Butyl Magnesium Incorporated Into the Catalyst Outside of the Reactor)

The procedure of Example 2 was substantially repeated but with such amounts of the dibutyl magnesium as to produce a modified catalyst having a Mg to Cr molar ratio of 1.0.

EXAMPLE 4

(Polymerization of Ethylene With 1-Hexene)

Under dry nitrogen, a 2.5-gallon autoclave reactor was filled with 4 liters of isobutane. 1.11 gram of the activated catalyst of Example 3 was transferred to the reactor. The reactor temperature was raised to 92° C. under agitation. 20 psia partial pressure of ethylene was added to the reactor first, followed by the addition of 15 ml of 1-hexene. Finally ethylene was introduced into the reactor to maintain 125 psia ethylene partial pressure, and the reactor temperature was maintained at 97° C. The polymerization was carried out for 104 minutes and yielded 946 grams of the polymer product. The polymerization was conducted with no intentionally added oxygen.

EXAMPLES 5–6

(Polymerization of Ethylene With 1-Hexene)

The procedure of Example 4 was substantially repeated with the catalysts of Examples 1 and 2.

The products were analyzed and the results of the analysis are summarized in Table 1 below:

TABLE 1

| EXAMPLE | Mg/Cr Molar Ratio | Melt Index ($I_2$) | HLMI ($I_{21}$) | MFR ($I_{21}/I_2$) | Density (gm/cc) | Productivity (g PE/g cat/hr) |
|---|---|---|---|---|---|---|
| 5 | 0 | 0.031 | 32.8 | 106 | 0.953 | 857 |
| 6 | 0.5 | 1.23 | 103 | 84 | 0.957 | 348 |
| 4 | 1.0 | 1.35 | 116 | 86 | 0.959 | 545 |

The data suggests that small amounts of magnesium on the catalyst substantially increase the HLMI of the resin produced with such a catalyst.

EXAMPLE 7

(Catalyst Preparation With Magnesium 2-Ethoxyethoxide)

The procedure of Example 2 was substantially repeated except that magnesium 2-ethoxyethoxide was used instead of dibutyl magnesium as the source of magnesium to provide a catalyst composition containing such an amount of magnesium that the Mg to Cr molar ratio was 0.25.

EXAMPLE 8

(Polymerization of Ethylene With 1-Hexene)

Ethylene was polymerized with 1-Hexene in the presence of 1.01 gms of the Example 7 catalyst, in accordance with the procedure of Example 4. The polymerization was conducted for 55 minutes and yielded 263 grams of a polymer with the following properties:

HLMI($I_{21}$)—175 gms/10 mins
MFR—83
Density—0.960 gms/cc

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

What is claimed is:

1. In an alpha-olefin polymerization catalyst composition, comprising a chromium compound, supported on a refractory oxide support,
an improvement comprising combining the catalyst composition with at least one catalyst modifier of the formula RMgR' where
R and R' are the same or different $C_1$–$C_{12}$ hydrocarbyl, alkoxy, alkenoxy or aryloxy groups,
the amount of the modifier being such that the thus-obtained modified catalyst composition has the molar ratio of magnesium (Mg) to chromium (Cr) of about 0.2 to about 1.25, both Mg and Cr being calculated as elemental metals.

2. A catalyst composition of claim 1 wherein the molar ratio of Mg to Cr is about 0.4 to about 1.1.

3. A catalyst composition of claim 2 wherein the molar ratio of Mg to Cr is about 0.5 to about 1.0.

4. A catalyst composition of claim 3 which additionally comprises a titanium compound.

5. A catalyst composition of claim 4 which is substantially non-spherical and irregular in shape, and which has a relatively broad particle size distribution range.

6. A catalyst composition of claim 5 which is a fluidized bed catalyst composition.

7. A catalyst composition of claim 6 which has the particle diameter of about 5 to about 250μ.

8. A catalyst composition of claim 7 which has the particle diameter of about 10 to about 200μ.

9. A catalyst composition of claim 8 which has the following particle size distribution:cumulative volume distribution—10 to 90% of the catalyst particles have diameters of from about 37 to about 117μ, as determined in a HIAC-ROYCO particle size analyzer.

10. A catalyst composition of claim 9 which has a median particle diameter of about 75μ, as determined by volume distribution.

11. A catalyst composition of claim 10 wherein the refractory oxide support has at least 75% of its pore volume in the pores of about 200 to about 500 Angstrom diameter.

12. A catalyst composition of claim 11 wherein $CrO_3$ or any compound of chromium calcinable to $CrO_3$ under the catalyst activation conditions is used as the chromium compound.

13. A catalyst composition of claim 12 wherein it is activated for at least about 10 hours at a temperature of at least about 800° C.

14. A catalyst composition of claim 13 wherein the refractory oxide support is silica having at least 80% of its pore volume in the pores of about 250 to about 450 Angstrom diameter.

15. A catalyst composition of claim 14 wherein the refractory oxide support is silica having at least 85% of its pore volume in the pores of about 250 to about 450 Angstrom diameter.

16. A catalyst composition of claim 15 containing about 0.05 to about 3.0% bgy weight of chromium, calculated as elemental chromium.

17. A catalyst composition of claim 16 containing about 0.10 to about 0.25% by weight of chromium, calculated as elemental chromium.

18. A catalyst composition of claim 17 containing about 0.13 to about 0.18% by weight of chromium, calculated as elemental chromium.

19. A catalyst composition of claim 18 containing about 0.15 to about 0.18% by weight of chromium, calculated as elemental chromium.

20. A catalyst composition of claim 19 wherein the refractory oxide support is silica containing 0.18% by weight of $CrO_3$ and having about 88% of its pore volume in the pores of about 250 to about 450 Angstrom diameter.

21. A catalyst composition of claim 20 wherein, prior to the activation of the catalyst, the support is dehydrated at a temperature of about 100° to about 500° C. for at least about 14 hours in a nitrogen atmosphere.

22. A catalyst composition of claim 21 wherein the support is dehydrated at a temperature of about 150° to about 300° C. for at least about 16 hours.

23. A catalyst composition of claim 22 wherein the support is dehydrated at a temperature of about 200° C. for about 16 hours.

24. A catalyst composition of claim 23 wherein, after the dehydration is completed, the titanium compound is deposited on the support.

25. A catalyst composition of claim 24 wherein, after the titanium compound deposition is completed, it is activated at a temperature of at least about 820° C. for at least about 16 hours.

26. A catalyst composition of claim 25 wherein it is activated at a temperature of about 820° to about 870° C.

27. A catalyst composition of claim 26 wherein it is activated at a temperature of about 825° C. for about 16 hours.

28. A catalyst composition of claim 27 wherein R and R' are $C_1$ to $C_8$ hydrocarbyl, alkoxy, alkenoxy or aryloxy groups.

29. A catalyst composition of claim 28 wherein R and R' are $C_2$ to $C_4$ normal alkyl or alkoxyalkoxide groups.

30. A catalyst composition of claim 29 wherein R and R' are the same and they are n-butyl.

31. A catalyst composition of claim 29 wherein R and R' are the same and they are ethoxyethoxide.

32. A catalyst composition of claim 30 wherein the molar ratio of Mg to Cr is about 0.5.

33. A catalyst composition of claim 30 wherein the molar ratio of Mg to Cr is about 1.0.

34. A catalyst composition of claim 33 wherein the catalyst composition is combined with the catalyst modifier outside of a polymerization reaction vessel.

35. A catalyst composition of claim 33 wherein the catalyst composition is combined with the catalyst modifier inside of a polymerization reaction vessel.

36. In a method of preparing a supported alpha-olefin polymerization catalyst composition comprising a chromium compound,
an improvement comprising combining the catalyst composition with
at least one catalyst modifier of the formula RMgR' where,
R and R' are the same or different $C_1$–$C_{12}$ hydrocarbyl, alkoxy, alkenoxy or aryloxy groups,
the amount of the modifier being such that the thus-obtained modified catalyst composition has the molar ratio of magnesium (Mg) to chromium (Cr) of about 0.2 to about 1.25, both Mg and Cr being calculated as elemental metals.

37. In an alpha-olefin polymerization catalyst composition, comprising a chromium compound, supported on a refractory oxide support,
an improvement comprising combining the catalyst composition with at least one catalyst modifier of the formula RMgR' where
R and R' are the same or different $C_1$–$C_{12}$ hydrocarbyl, alkoxy, alkenoxy or aryloxy groups, the amount of the modifier being such that the thus-obtained modified catalyst composition has the molar ratio of Mg to Cr of about 0.2 to about 1.25, both, the Mg and Cr being calculated as elemental metals, the modifier enabling the modified catalyst composition to produce polymers having substantially higher HLMI at polymerization temperatures of at least about 5° C. lower than a comparable catalyst composition prepared without the modifier.

38. A catalyst composition of claim 37 wherein the modifier enables the modified catalyst composition to produce polymers having HLMI an order of magnitude greater than a comparable catalyst composition prepared without the modifier.

39. A catalyst composition of claim 38 wherein the modifier enables the modified catalyst composition to produce polymers having HLMI of greater than 100.

40. A method of claim 36 wherein the molar ratio of Mg to Cr is about 0.4 to about 1.1.

41. A method of claim 40 wherein the molar ratio of Mg to Cr is about 0.5 to about 1.0.

42. A method of claim 41 wherein the catalyst composition additionally comprises a titanium compound.

43. A method of claim 42 wherein the catalyst composition is substantially non-spherical and irregular in shape, and it has a relatively broad particle size distribution range.

44. A method of claim 43 wherein the catalyst composition is a fluidized bed catalyst composition.

45. A method of claim 44 wherein the catalyst composition has the particle diameter of about 5 to about 250µ.

46. A method of claim 45 wherein the catalyst composition has the particle diameter of about 10 to about 200µ.

47. A method of claim 46 wherein the catalyst composition has the following particle size distribution:- cumulative volume distribution—10 to 90% of the catalyst particles have diameters of from about 37 to about 117µ as determined in a HIAC-ROYCO particle size analyzer.

48. A method of claim 47 wherein the catalyst composition has a median particle diameter of about 75µ, as determined by volume distribution.

49. A method of claim 48 wherein the catalyst composition is supported on a refractory oxide support having at least 75% of its pore volume in the pores of about 200 to about 500 Angstrom diameter.

50. A method of claim 49 wherein $CrO_3$ or any compound of chromium calcinable to $CrO_3$ under the catalyst activation conditions is used as the chromium compound.

51. A method of claim 50 wherein the catalyst composition is activated for at least about 10 hours at a temperature of at least about 800° C.

52. A method of claim 51 wherein the refractory oxide support is silica having at least 80% of its pore volume in the pores of about 250 to about 450 Angstrom diameter.

53. A method of claim 52 wherein the refractory oxide support is silica having at least 85% of its pore volume in the pores of about 250 to about 450 Angstrom diameter.

54. A method of claim 53 wherein the catalyst composition contains about 0.05 to about 3.0% by weight of chromium, calculated as elemental chromium.

55. A method of claim 54 wherein the catalyst composition contains about 0.10 to about 0.25% by weight of chromium, calculated as elemental chromium.

56. A method of claim 55 wherein the catalyst composition contains about 0.13 to about 0.18% by weight of chromium, calculated as elemental chromium.

57. A method of claim 56 wherein the catalyst composition contains about 0.15 to about 0.18% by weight of chromium, calculated as elemental chromium.

58. A method of claim 57 wherein the refractory oxide support is silica containing 0.18% by weight of $CrO_3$ and having about 88% of its pore volume in the pores of about 250 to about 450 Angstrom diameter.

59. A method of claim 58 wherein, prior to the activation of the catalyst, the support is dehydrated at a temperature of about 100 to about 500° C. for at least about 14 hours in a nitrogen atmosphere.

60. A method of claim 59 wherein the support is dehydrated at a temperature of about 150° to about 300° C. for at least about 16 hours.

61. A method of claim 60 wherein the support is dehydrated at a temperature of about 200° C. for about 16 hours.

62. A method of claim 61 wherein, after the dehydration is completed, the titanium compound is deposited on the support.

63. A method of claim 62 wherein, after the titanium compound deposition is completed, the catalyst is activated at a temperature of at least about 820° C. for at least about 16 hours.

64. A method of claim 63 wherein the catalyst is activated at a temperature of about 820° C. to about 870° C.

65. A method of claim 64 wherein the catalyst is activated at a temperature of about 825° C. for about 16 hours.

66. A method of claim 65 wherein R and R' are $C_1$ to $C_8$ hydrocarbyl, alkoxy, alkenoxy or aryloxy groups.

67. A method of claim 66 wherein R and R' are $C_2$ to $C_4$ normal alkyl or alkoxyalkoxide groups.

68. A method of claim 67 wherein R and R' are the same and they are n-butyl.

69. A method of claim 68 wherein R and R' are the same and they are ethoxyethoxide.

70. A method of claim 67 wherein the molar ratio of Mg to Cr is about 0.5.

71. A method of claim 70 wherein the molar ratio of Mg to Cr is about 1.0.

72. A method of claim 71 wherein the catalyst composition is combined with the catalyst modifier outside of a polymerization reaction vessel.

73. A method of claim 71 wherein the catalyst composition is combined with the catalyst modifier inside of a polymerization reaction vessel.

74. A method of claim 72 wherein the modifier enables the modified catalyst composition to produce polymers having substantially higher HLMI at polymerization temperatures of at least about 5° C. lower than a comparable ccatalyst composition prepared without the modifier.

75. A method of claim 74 wherein the modifier enables the modified catalyst composition to produce polymers having HLMI an order of magnitude greater than a comparable catalyst composition prepared without the modifier.

76. A method of claim 75 wherein the modifier enables the modified catalyst composition to produce polymers having HLMI of greater than 100.

77. A method of claim 73 wherein the modifier enables the modified catalyst composition to produce polymers having substantially higher HLMI at polymerization temperatures of at least about 5° C. lower than a comparable catalyst composition prepared without the modifier.

78. A method of claim 77 wherein the modifier enables the modified catalyst composition to produce polymer having HLMI an order of magnitude greater than a comparable catalyst composition prepared without the modifier.

79. A method of claim 78 wherein the modifier enables the modified catalyst composition to produce polymers having HLMI of greater than 100.

* * * * *

UNITED STATES PATENT AND TRADEMARK OFFICE
CERTIFICATE OF CORRECTION

PATENT NO. : 4,816,432
DATED : March 28, 1989
INVENTOR(S) : J.T.T. Hsieh

It is certified that error appears in the above-identified patent and that said Letters Patent is hereby corrected as shown below:

Col. 4, line 9    delete "utilizes" and insert --utilize--.
Col. 13, line 48    delete "bgy" and insert --by--.
Col. 16, line 59    delete "ccatalyst" and insert --catalyst--.

Signed and Sealed this

Twelfth Day of December, 1989

*Attest:*

JEFFREY M. SAMUELS

*Attesting Officer*    *Acting Commissioner of Patents and Trademarks*